Patented Feb. 13, 1945

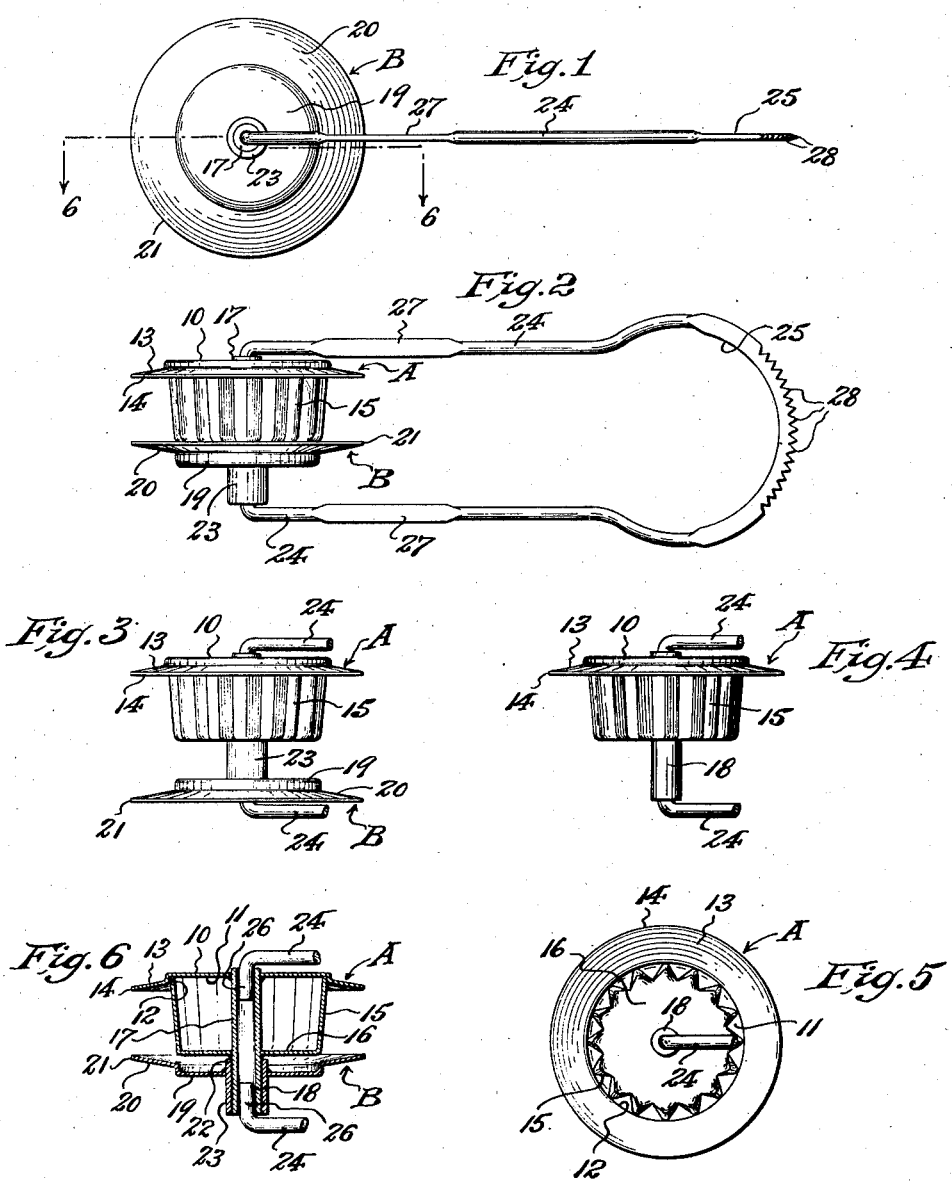

2,369,452

UNITED STATES PATENT OFFICE 2,369,452

DOUGH CUTTER AND CRIMPER

Homer Gamache, Newark, N. J., assignor to Acme Metal Goods Manufacturing Co., Newark, N. J., a firm composed of August C. Fischer, Charles F. Fischer, and Harry F. Fischer Application December 1, 1943, Serial No. 512,462

3 Claims. (Cl. 107—49)

This invention relates to improvements in culinary tools, and the invention has reference, more particularly, to a novel construction of dough cutting and crimping tool for kitchen use.

The invention has for an object to provide a novel construction of dough cutting and crimping tool so designed that it may be quickly and easily arranged to cut dough optionally into either comparatively narrow or comparatively broad strips, or arranged to serve as a pie or pastry trimmer and crimper.

The invention has for another object to provide a culinary tool comprising a cutting and crimper head rotatably mounted on a supporting and manipulating handle member, together with a detachable cooperating cutter member which may be variously spaced relative to the cutting element of the cutting and crimper head, whereby to adapt the tool for optionally cutting dough into either comparatively narrow strips or comparatively broad strips.

Other objects of this invention, not at this time more particularly enumerated, will be understood from the following detailed description of the same.

An illustrative embodiment of this invention is shown in the accompanying drawing, in which—

Fig. 1 is a side elevational view of the tool; Fig. 2 is a plan view of the tool as arranged for cutting dough into comparatively narrow strips; Fig. 3 is a fragmentary plan view of the tool as arranged for cutting dough into comparatively broad strips; Fig. 4 is a fragmentary plan view of the tool as arranged for trimming and crimping pie crust; Fig. 5 is a side elevational view of the tool as arranged in Fig. 4; and Fig. 6 is a fragmentary sectional view of the tool, taken on line 6—6 in Fig. 1.

Similar characters of reference are employed in the above described views, to indicate corresponding parts.

The illustrative form of the tool, as shown in said drawing, comprises a cutting and crimper head formed by a circular cutter disk A and an axial crimper barrel of reduced diameter projecting inwardly therefrom. Said cutter disk comprises an outwardly dished central portion 10 adapted to provide an internal seat 11 bounded by an annular shoulder 12 from which extends the circular cutting blade portion 13. Said cutting blade portion 13 is preferably inwardly inclined or flared toward the cutting edge 14 thereof, whereby, together with the dished portion 10, to stiffen the same against accidental distortion. The crimper barrel is formed by a longitudinally fluted body 15 tapering somewhat from its base toward its free end. Preferably said body 15 comprises a metallic shell closed by an end wall 16 at its free end. The base end of said crimper barrel is seated in the seat 11 of the cutter disk A, and within the confines of the shoulder 12 bounding said seat, being thus disposed concentric to the cutting blade portion 13 of the cutter disk, whereby the latter extends around the base of said crimper barrel so as to project therefrom. Extending axially through the cutter disk and crimper barrel is a tubular hub member 17 of a length adapted to provide a free extension 18 extending substantially beyond the end wall 16 of said crimper barrel. Said cutter disk, crimper barrel and hub member may be affixed together, in the described assembled relation, in any suitable way, as, e. g., by soldering one part to another, or by suitable mechanical fastening means.

Provided for cooperation with the cutter disk A is a second cutter disk B. Said cutter disk B comprises an outwardly dished central portion 19 from which extends the circular cutting blade portion 20, the latter being preferably inwardly inclined or flared toward the cutting edge 21 thereof, all whereby the cutter disk is stiffened against accidental distortion. Extending axially through said second cutter disk B is a tubular hub member 22 having an internal diameter sized to slidably engage the same over the extension 18 of the hub member 17 with which the cutting and crimper head is provided. Said hub member 22 is of a total length approximating the length of the extension 18 of the hub member 17 of the cutting and crimper head, and is so related to the second cutter disk B as to provide a major extension 23 extending substantially beyond one face, e. g., the external face of said cutter disk B.

The cutting and crimper structure is rotatably supported by and in connection with a handle member. Said handle member comprises a generally U-shaped formation made of spring wire, thus providing a pair of laterally spaced leg portions 24, joined by a loop end portion 25. The free extremities of each leg portion are formed to provide in-turned journal elements 26. To stiffen the leg portions 24 against lateral bending, portions thereof intermediate the loop end portion 25 and the journal elements 26 may be flattened in horizontal plane, as at 27. The loop end portion 25 is also flattened in horizontal plane, and its outer marginal portion is serrated to provide a succession of sharpened pricking teeth 28 therealong.

To mount the cutting and crimper structure on the handle member, the leg portions 24 of the latter are spread to allow the hub member 17—18 to be positioned and aligned between the journal elements 26 of the handle member, whereupon the spread leg portions 24 are released to allow said journal elements 26 to respectively enter the opposite ends of the bore of said hub member 17—18, so as to rotatably support the cutting and crimper structure on the handle member.

When it is desired to use the tool for the purpose of cutting dough into comparatively narrow strips, such as required, e. g., for the making of noodles, the hub member 22 of the second cutter disk B is telescopically mounted on the extension 18 of the hub-member 17 with the major extension 23 of the former outward, thus positioning said second cutter disk B closely adjacent to the free end of the crimper head, and in comparatively closely spaced relation to the cutter disk A (see Figs. 2 and 6). The cutter disks A and B being parallelly spaced and free to rotate, their cutting edges may be applied to a sheet of dough desired to be cut, and rolled along and through the same, thus cutting the dough into comparatively narrow strips.

When it is desired to use the tool for the purpose of cutting dough into comparatively broad strips, such as required, e. g., for the making of criss-cross top crusts for pies and similar pastry, the cutting and crimper structure is dismounted from the handle member, and the second cutter disk B is reversed and its hub member 22 telescopically mounted on the extension 18 of the hub member 17 with the major extension 23 of the former inward, so as to abut the closed end 16 of the crimper head 15, thus positioning said second cutter disk B in outwardly offset relation to said crimper head, and in comparatively widely spaced relation to the cutter disk A, when the thus assembled structure is again mounted on the handle member (see Fig. 3). By rolling the thus arranged tool along and through a sheet of dough, the latter will be cut by the cutter disks into comparatively broad strips.

When it is desired to use the tool for the purpose of trimming and crimping pie crust, the cutting and crimper structure is dismounted from the handle member and the second cutter disk B removed, whereupon the cutter disk A and associated crimper barrel 15 is remounted on the handle member (see Figs. 4 and 5). When the tool, as thus arranged, is moved around the edge of the pie plate, the cutter disk A will trim away the surplus dough, while at the same time the crimper head 15, by reason of its fluted periphery, will press together and crimp the marginal portions of the top and bottom dough layers of the pie, so that the same will unite in the baking to form a sealed edge in the crust of the finished pie. The inward inclination or flaring of the blade portion 13 of the cutter disk A has the further advantage of more closely and uniformly following the edge of the pie plate during the cutting or trimming operation thereof.

The pricking teeth 28 of the handle member loop afford convenient means for piercing the top crust of a pie so as to form desired vent openings therein.

From the above description it will be obvious that a very compact, simple and effective tool is provided by this invention, and one which can easily and quickly be arranged to selectively perform several operations.

I am aware that some changes could be made in the above described constructions without departing from the scope of this invention as defined by the following claims. It is therefore intended that all matter contained in the foregoing description or shown in the accompanying drawing shall be interpreted as illustrative and not in a limiting sense.

I claim:

1. A culinary tool for the purposes described comprising a combined cutting and crimper means having a tubular hub member provided with an extension projecting substantially beyond one side of said cutting and crimper means, a detachable and reversible cutting means having a tubular hub member projecting substantially beyond one side thereof and sized to telescopically engage over the extension of said first mentioned hub member, and handle means having journal elements removably engageable in the ends of said first mentioned hub member to rotatably support the same.

2. A culinary tool for the purposes described comprising a combined cutting and crimper means having a tubular hub member provided with an extension projecting substantially beyond one side of said cutting and crimper means, a detachable and reversible cutting means having a tubular hub member projecting substantially beyond one side thereof and sized to telescopically engage over the extension of said first mentioned hub member, and a U-shaped handle member, the legs of said handle terminating in in-turned journal elements removably engageable in the ends of said first mentioned hub member to rotatably support the same.

3. A culinary tool for the purposes described comprising a circular cutter disk, a fluted crimper head of less diameter axially extending from the inside face of said cutter disk, a tubular hub member to which said cutter disk and crimper head are affixed, said hub member having an extension projecting substantially beyond the free end of said crimper head, a second detachable circular cutter disk having a tubular hub member projecting exteriorly beyond one face thereof and sized to telescopically engage over the extension of said first mentioned hub member, said second hub member being reversibly engageable with said first hub member extension, whereby to variably space said second cutter disk relative to said first cutter disk, and a handle means having journal elements removably engageable in the ends of said first hub member whereby to rotatably support the same.

HOMER GAMACHE.